(12) United States Patent
Kuwano

(10) Patent No.: US 9,578,662 B2
(45) Date of Patent: Feb. 21, 2017

(54) GATEWAY AND CONTROL DEVICE, AND COMMUNICATION CONTROLLING METHODS FOR THE SAME

(75) Inventor: Hiroaki Kuwano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/347,515

(22) PCT Filed: May 14, 2012

(86) PCT No.: PCT/JP2012/003130
§ 371 (c)(1),
(2), (4) Date: Mar. 26, 2014

(87) PCT Pub. No.: WO2013/046488
PCT Pub. Date: Apr. 4, 2013

(65) Prior Publication Data
US 2014/0220991 A1    Aug. 7, 2014

(30) Foreign Application Priority Data

Sep. 27, 2011 (JP) .................................. 2011-210566

(51) Int. Cl.
H04W 72/00 (2009.01)
H04W 76/02 (2009.01)
(Continued)

(52) U.S. Cl.
CPC ......... *H04W 76/02* (2013.01); *H04W 36/0055* (2013.01); *H04W 72/0406* (2013.01);
(Continued)

(58) Field of Classification Search
CPC ............. H04W 36/08; H04W 36/0055; H04W 36/0016; H04W 36/10; H04W 36/18; H04W 76/028; H04W 88/16; H04W 36/00; H04W 76/046; H04W 76/06; H04W 76/068
See application file for complete search history.

(56) References Cited

U.S. PATENT DOCUMENTS 7,697,935 B2 *  4/2010  Guyot .................. H04W 36/14
                                                    370/230
2003/0220102 A1 * 11/2003  Kallio ........................ 455/422.1
(Continued)

FOREIGN PATENT DOCUMENTS

CN    101151936 A    3/2008
CN    102457896 A    5/2012
(Continued)

OTHER PUBLICATIONS

International Search Report corresponding to PCT/JP2012/003130, dated Jun. 12, 2012; 2 pages.
(Continued)

*Primary Examiner* — Charles Appiah
*Assistant Examiner* — Edward Zhang
(74) *Attorney, Agent, or Firm* — Wilmer Cutler Pickering Hale and Dorr LLP

(57) ABSTRACT

In order to implement handover to a femto cell without making any modification to UEs, a gateway (50) relays traffic between a core network (60, 70) and a plurality of base stations (20_1-20_4) that are respectively incorporated into the core network (60, 70) through a public network. The gateway (50) generates an RRC Connection Release message for prompting establishment of a new RRC connection, when it is notified from the core network (60, 70) that a mobile station (10) is handed over to any one of the plurality of base stations (20_1-20_4). Then, the gateway (50) causes the core network (60, 70) to instruct a control device (40), which has established an RRC connection to the mobile
(Continued)

station (10), to transfer the RRC Connection Release message to the mobile station (10).

16 Claims, 9 Drawing Sheets

(51) Int. Cl.
*H04W 72/04* (2009.01)
*H04W 36/00* (2009.01)
H04W 36/04 (2009.01)
H04W 76/06 (2009.01)
H04W 84/04 (2009.01)

(52) U.S. Cl.
CPC ............ *H04W 36/04* (2013.01); *H04W 76/06* (2013.01); *H04W 84/045* (2013.01)

(56) References Cited

U.S. PATENT DOCUMENTS

| | | | |
|---|---|---|---|
| 2007/0254620 A1 | 11/2007 | Lindqvist et al. | |
| 2010/0027503 A1* | 2/2010 | Eravelli et al. | 370/331 |
| 2010/0098023 A1* | 4/2010 | Aghili | H04W 36/0022 370/331 |
| 2010/0260097 A1* | 10/2010 | Ulupinar | H04B 7/2606 370/315 |
| 2010/0260147 A1* | 10/2010 | Xing | H04K 3/226 370/332 |
| 2011/0090864 A1* | 4/2011 | Nylander et al. | 370/331 |
| 2011/0117905 A1* | 5/2011 | Huang | H04W 76/028 455/422.1 |
| 2011/0136490 A1 | 6/2011 | Aoyagi | |
| 2012/0207091 A1* | 8/2012 | Aoyagi | H04W 60/04 370/328 |
| 2013/0260767 A1* | 10/2013 | Hosono | H04W 36/04 455/437 |
| 2014/0235242 A1* | 8/2014 | Granzow et al. | 455/436 |

FOREIGN PATENT DOCUMENTS

| | | |
|---|---|---|
| EP | 2249603 A1 | 11/2010 |
| EP | 2262316 | 12/2010 |
| EP | 2282581 | 2/2011 |
| JP | 2010-109664 | 5/2010 |
| JP | 2010-537480 | 12/2010 |
| RU | 2316895 C2 | 2/2008 |
| WO | WO-2009/145302 | 12/2009 |
| WO | WO-2011/043015 | 4/2011 |
| WO | WO-2011/049129 A1 | 4/2011 |
| WO | WO-2011/099178 A1 | 8/2011 |

OTHER PUBLICATIONS

Huawei, "Support of Inbound Handover for Legacy Mobile", [online], 3GPP TSG-RAN WG3 #64, May 2009; 3 pages.
Japanese Office Action issued by the Japanese Patent Office for Application No. 2013-535820 mailed on Sep. 2, 2014 (5 pages) (with partial translation).
Extended European Search Report corresponding to European Application No. 12834937.0, dated Sep. 28, 2015, 10 pages.
Nokia Siemens Networks, "Proposals for U-RNTI Management Issues", 3GPP TSG-RAN3 Meeting #70, Jacksonville, USA, Nov. 15-19, 2010, R3-103594, 2 pages.
Russian Office Action issued by the Russian Patent Office for Application No. 2014117015/(026825) dated Apr. 1, 2015 (9 pages).
Russian Office Action issued by the Russian Federal Service on Intellectual Property for Application No. 2014117015 dated Jul. 28, 2015 (14 pages).
Chinese First Office Action issued in corresponding Chinese Application No. 201280047321.6, dated Nov. 22, 2016, 17 pages.

\* cited by examiner

Fig. 5

RRC Connection Release

| Information Element/Group name | Need | Type and Reference | Semantics description | Version |
|---|---|---|---|---|
| Message Type | MP | Message Type | | |
| UE information elements | | | | |
| CHOICE identity type | CV-CCCH | | | REL-5 |
| RRC transaction identifier | MP | 10.3.3.36 | | |
| Integrity check info | CV-DCCH | 10.3.3.16 | Integrity check info is included if integrity protection is applied. | |
| N308 | CH-Cell_DCH | Integer(1..8) | | |
| Release Cause | MP | 10.3.3.32 | | |
| UE Mobility State Indicator | CV-DCCH_MD | Enumerated (High-mobility Detected) | Absence of this IE implies that, according to [4] the UE shall consider itself being in the mobility stat the UE has maintained in CELL_DCH stat or being not in high-mobility state when entering in Idle Mode, if applicable. | REL-7 |
| Other information elements | | | | |
| Rplmn information | OP | 10.3.8.15 | | |
| Redirection info | OP | 10.3.3.29 | | REL-6 |

Release Cause

| Information Element/Group name | Need | Type and Reference | Semantics description |
|---|---|---|---|
| Release Cause | MP | Enumerated (normal event, unspecified, pre-emptive release, congestion, establishment reject, directed signalling connection re-establishment, user inactivity) | One spare value is needed. |

Fig. 6

Relocation Request Acknowledge

| IE/Group Name | Presence | IE Type and Reference | Semantics description | Criticality | Assigned criticality |
|---|---|---|---|---|---|
| Message Type | M | 9.2.1.1 | | YES | reject |
| Target RNC to Source RNC Transparent Container | O | 9.2.1.30 | | YES | ignore |
| RABs Setup List | O | 9.2.1.2 etc. | | YES | ignore |
| RABs Failed To Setup List | O | 9.2.1.2, 9.2.1.4 | | YES | ignore |
| Chosen Integrity Protection Algorithm | O | 9.2.1.13 | Indicates the Integrity Protection algorithm that will be used by the Target RNC. | YES | ignore |
| Chosen Encryption Algorithm | O | 9.2.1.14 | Indicates the Encryption algorithm that will be used by the Target RNC. | YES | ignore |
| Criticality Diagnostics | O | 9.2.1.35 | | YES | ignore |
| New BSS To Old BSS Information | O | 9.2.1.47 | Defined in [11]. | YES | ignore |
| CSG Id | O | 9.2.1.85 | | YES | ignore |

Fig. 7

Target RNC to Source RNC Transparent Container

| IE/Group Name | Presence | IE Type and Reference | Semantics description |
|---|---|---|---|
| RRC Container | M | OCTET STRING | |
| d-RNTI | O | INTEGER (0..1048575) | May be included to allow the triggering of the Relocation Detect procedure from the Iur interface |

Fig. 8

GATEWAY AND CONTROL DEVICE, AND COMMUNICATION CONTROLLING METHODS FOR THE SAME

CROSS-REFERENCE TO RELATED APPLICATIONS

This application is a national stage application of International Application No. PCT/JP2012/003130 entitled "Gateway, Control Device, and Communication Control Method Therefor," filed on May 14, 2012, which claims the benefit of the priority of Japanese Patent Application No. 2011-210566, filed on Sep. 27, 2011, the disclosures of each of which are hereby incorporated by reference in their entirety.

TECHNICAL FIELD

The present invention relates to a gateway, a control device, and communication controlling methods for the gateway and the control device. In particular, the present invention relates to a technique to handover a mobile station (UE: User Equipment), which is compatible with UMTS (Universal Mobile Telecommunications System) defined in 3GPP (3rd Generation Partnership Project), from a macro cell to a femto cell.

BACKGROUND ART

An HNB (Home Node B) is a small-sized radio base station which can be installed within end-user's premises or a similar environment, and connects a UE compatible with a UMTS system to a core network of a mobile operator through a PDN (Public Data Network) such as a broadband IP (Internet Protocol) backhaul.

An HNB-GW (Gateway) accommodates a plurality of HNBs connected through the PDN, and relays traffic between each HNB and communication nodes such as an MSC (Mobile Switching Centre), an SGSN (Serving GPRS (General Packet Radio Service) Support Node), an MGW (Media Gateway) and a GGSN (Gateway GPRS Support Node), which form the core network.

An NB (Node B) is a radio base station which is installed outdoors or a similar environment by the mobile operator, and connects the UE compatible with the UMTS system to the core network. The coverage of a cell (generally, referred to as "macro cell") formed by the NB is large, so that the number of UEs which can be accommodated in the cell is large. On the other hand, the coverage of a cell formed by the above-mentioned HNB is much smaller than that formed by the NB. Therefore, this cell is generally referred to as "femto cell".

An RNC (Radio Network Controller) is a control device which accommodates a plurality of NBs and controls radio resources between each NB and the UE. 3GPP has defined RRC (Radio Resource Control) protocol for controlling the radio resources. This RRC protocol is terminated by the RNC and the UE.

Note that details of the HNB, the HNB-GW, the UE, the NB, the RNC, the MSC, the MGW, the SGSN, the GGSN and the PDN have been defined in various specifications of 3GPP (see TS 22.220, TS 25.467, TS 23.002, TS 23.060, TS 25.310 and the like).

In the UMTS, handover between cells is triggered by a Measurement Report message notified from the UE to the RNC. Specifically, the RNC instructs the UE to measure radio quality of a neighboring cell by using a control message in compliance with the RRC protocol (hereinafter, this message will be sometimes referred to as "RRC message"). When the RNC determines that the radio quality of the neighboring cell is higher based on a measurement result notified by the Measurement Report, the RNC instructs the UE to perform the handover.

PSCs (Primary Scrambling Codes) are assigned to respective cells. The UE identifies each cell by using the PSC. The RNC indicates the PSC to the UE to instruct which cell is to be measured for radio quality. The PSCs represent 512 different values, and are assigned so as not to overlap between neighboring cells. The RRC message can designate up to 32 neighboring cells using the same frequency as a cell on which the UE camps and up to 32 neighboring cells using frequencies different from that used in the cell on which the UE camps, upon instructing the UE to measure the quality.

A radius of the macro cell generally extends from several hundred meters to several kilometers. On the other hand, generally a radius of the femto cell is from several meters to several tens of meters, and is set within the range of a house, a company or the like. Moreover, a certain limited number of PSCs among the 512 PSCs are assigned for dedicated use in femto cells, and thus the assigned PSC is shared between femto cells. In other words, there may be a lot of femto cells to which the same PSC is assigned under the coverage of a certain macro cell.

In this case, the RNC cannot determine which femto cell is measured by the UE for radio quality, even if the RNC causes the UE to measure the radio quality of the femto cell and the Measurement Report message notifies about the result of the measurement. As a result, there is caused a problem that the RNC cannot uniquely identify the femto cell serving as a handover destination, and thus hands the UE over to the wrong femto cell even if a handover procedure is performed.

In order to address this problem, there has been studied in 3GPP Release 9, a method of reporting the Measurement Report message with an ID of the measured cell.

CITATION LIST

Patent Literature

PTL 1: Japanese Unexamined Patent Application Publication No. 2010-109664
PTL 2: Published Japanese Translation of PCT International Publication for Patent Application No. 2010-537480

SUMMARY OF INVENTION

Technical Problem

However, the inventor of this application has found that there is a problem that it is difficult for the method studied in 3GPP Release 9 to be introduced. Specifically, a lot of UEs in compliance with a standard on or before Release 8, which cannot report the cell ID, have been distributed in the market. Therefore, it is not possible by the method studied in Release 9 to hand such UEs over to the femto cell. Moreover, it is virtually impossible to make modifications to the existing UEs distributed to the market to install therein the function of reporting the cell ID.

Note that as a referential technique, PTLs 1 and 2 disclose a technique to install a CSG (Closed Subscriber Group) function in a UE, thereby handing the UE over to a femto cell. However, this technique is not at all the one for handing the existing UE over to the femto cell, and thus has the same problem as the method studied in 3GPP Release 9.

Accordingly, an exemplary object of the present invention is to implement handover to a femto cell without making any modification to UEs.

Solution to Problem

In order to achieve the above-mentioned object, a gateway according to a first exemplary aspect of the present invention relays traffic between a core network and a plurality of base stations respectively incorporated into the core network through a public network. This gateway includes: first communication means for communicating with the plurality of base stations through the public network; second communication means for communicating with the core network; and control means for controlling the first and second communication means to relay the traffic. The control means is configured to: generate an RRC (Radio Resource Control) Connection Release message for prompting establishment of a new RRC connection, when it is notified from the core network that a mobile station is handed over to any one of the plurality of base stations; and cause the core network to instruct a control device to transfer the RRC Connection Release message to the mobile station, the control device having established an RRC connection to the mobile station.

Further, a control device according to a second exemplary aspect of the present invention controls radio resources upon wireless communication between a base station and a mobile station, the base station being connected to the control device itself, the mobile station camping on the base station. This control device includes: first communication means for communicating with the mobile station through the base station; second communication means for communicating with a core network; and control means for controlling the first and second communication means to control the radio resources. The control means is configured to: notify, through the core network, a gateway that it is determined that the mobile station is to be handed over to a different base station based on a measurement report regarding radio quality of a neighboring cell, the measurement report being received from the mobile station, the different base station being incorporated into the core network through a public network, the gateway relaying traffic between the core network and the different base station; and transfer, when an RRC Connection Release message is received from the gateway in response to the notification, the RRC Connection Release message to the mobile station.

Further, a control device according to a third exemplary aspect of the present invention controls radio resources upon wireless communication between a base station and a mobile station, the base station being connected to the control device itself, the mobile station camping on the base station. This control device includes: first communication means for communicating with the mobile station through the base station; second communication means for communicating with a core network; and control means for controlling the first and second communication means to control the radio resources. The control means is configured to transmit to the mobile station an RRC Connection Release message for prompting establishment of a new RRC connection, when it is determined that the mobile station is to be handed over to a different base station based on a measurement report regarding radio quality of a neighboring cell, the measurement report being received from the mobile station, the different base station being incorporated into the core network through a public network.

Further, a controlling method according to a fourth exemplary aspect of the present invention provides a method of controlling a gateway that relays traffic between a core network and a plurality of base stations respectively incorporated into the core network through a public network. This controlling method includes: generating an RRC Connection Release message for prompting establishment of a new RRC connection, when it is notified from the core network that a mobile station is handed over to any one of the plurality of base stations; and causing the core network to instruct a control device to transfer the RRC Connection Release message to the mobile station, the control device having established an RRC connection to the mobile station.

Further, a controlling method according to a fifth exemplary aspect of the present invention provides a method of controlling a control device that controls radio resources upon wireless communication between a base station and a mobile station camping on the base station. This controlling method includes: notifying, through a core network, a gateway that it is determined that the mobile station is to be handed over to a different base station based on a measurement report regarding radio quality of a neighboring cell, the measurement report being received from the mobile station through the base station, the different base station being incorporated into the core network through a public network, the gateway relaying traffic between the core network and the different base station; and transferring, when an RRC Connection Release message is received from the gateway in response to the notification, the RRC Connection Release message to the mobile station.

Furthermore, a controlling method according to a sixth exemplary aspect of the present invention provides a method of controlling a control device that controls radio resources upon wireless communication between a base station and a mobile station camping on the base station. This controlling method includes: determining whether or not to hand the mobile station over to a different base station that is incorporated into a core network through a public network, based on a measurement report regarding radio quality of a neighboring cell, the measurement report being received from the mobile station through the base station; and transmitting to the mobile station an RRC Connection Release message for prompting establishment of a new RRC connection, when it is determined to hand the mobile station over to the different base station.

Advantageous Effects of Invention

According to the present invention, it is possible to implement handover to a femto cell without making any modification to UEs.

BRIEF DESCRIPTION OF DRAWINGS

FIG. 5 is a diagram showing a configuration example of an RRC Connection Release message used for the gateway according to the first exemplary embodiment of the present invention;

FIG. 6 is a diagram showing a configuration example of information elements in the RRC Connection Release message used for the gateway according to the first exemplary embodiment of the present invention;

FIG. 7 is a diagram showing a configuration example of a response message used for the gateway according to the first exemplary embodiment of the present invention;

FIG. 8 is a diagram showing a configuration example of information elements in the response message used for the gateway according to the first exemplary embodiment of the present invention.

DESCRIPTION OF EMBODIMENTS

Figure 1:
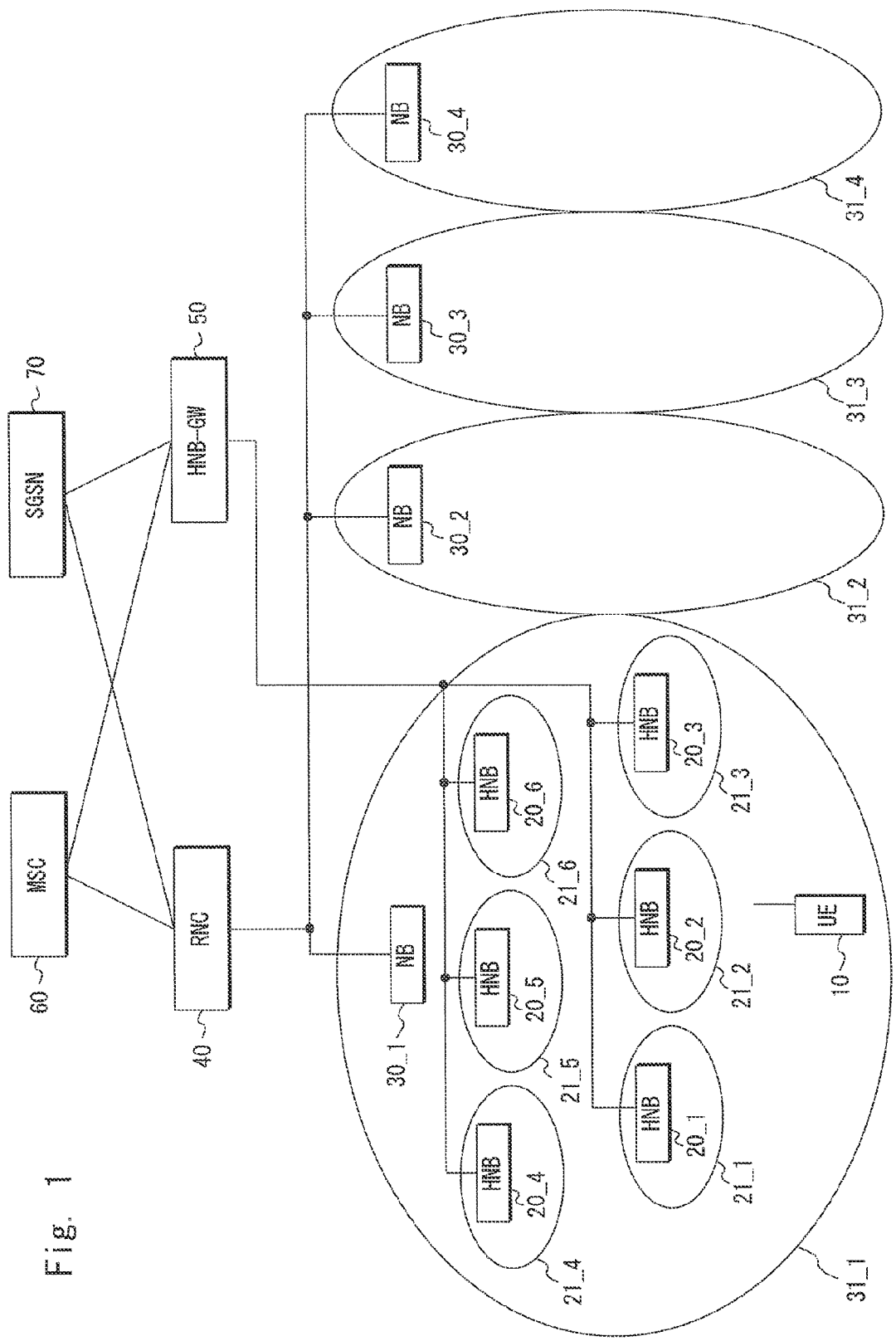
FIG. 1 is a block diagram showing a configuration example of a network to which a gateway and a control device according to a first exemplary embodiment of the present invention are applied.

Hereinafter, first and second exemplary embodiments of a gateway and a control device according to the present invention, and a network to which these gateway and control device are applied, will be described with reference to FIGS. 1 to 9. Note that in the drawings, identical reference symbols denote identical elements and redundant explanations thereof will be omitted as appropriate to clarify the explanation.

First Exemplary Embodiment

As shown in FIG. 1, a network according to this exemplary embodiment includes a UE 10, a plurality of HNBs 20_1 to 20_6 (hereinafter may be collectively referred to by a code 20), a plurality of NBs 30_1 to 30_4 (hereinafter may be collectively referred to by a code 30), an RNC 40, an HNB-GW 50, an MSC 60, and an SGSN 70. The HNBs 20_1 to 20_6 form femto cells 21_1 to 21_6, respectively. The NBs 30_1 to 30_4 form macro cells 31_1 to 31_4, respectively.

In the example shown in FIG. 1, the UE 10 camps on the macro cell 31_1, thereby being wirelessly connected to the NB 30_1. The femto cells 21_1 to 21_6 are placed so as to be separated from each other within the macro cell 31_1. The same PSC (but different from that assigned to the macro cell 31_1) is assigned to each of the femto cells 21_1 to 21_6. Moreover, the HNB 20_1 to 20_6 are connected to the HNB-GW 50 through a public network (not shown). Meanwhile, the NB 30_1 to 30_4 are connected to the RNC 40. The RNC 40 and the HNB-GW 50 are connected to the MSC 60 and the SGSN 70 which form a CN (Core Network).

Figure 2:
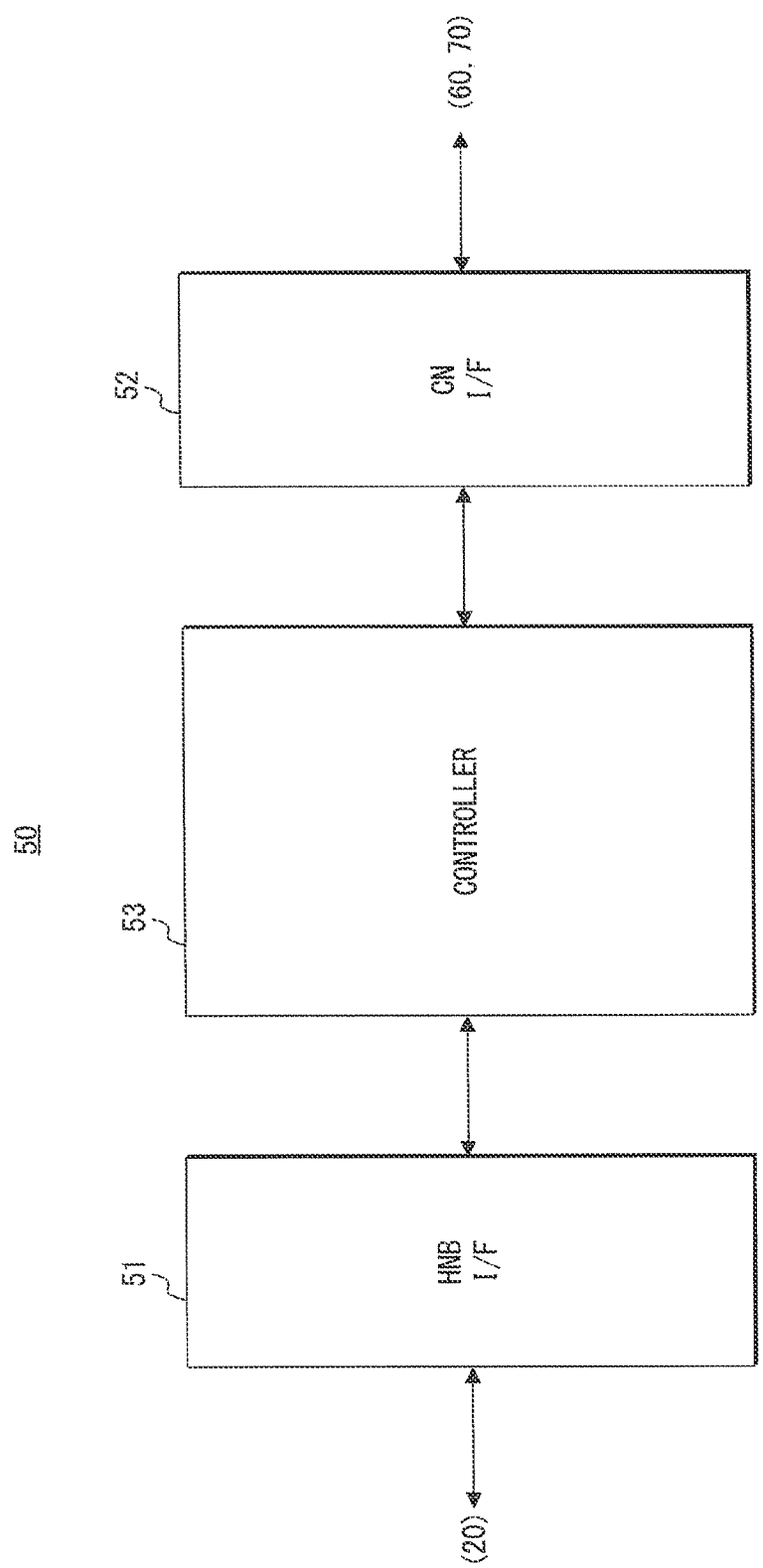
FIG. 2 is a block diagram showing a configuration example of the gateway according to the first exemplary embodiment of the present invention.

Among them, as shown in FIG. 2, the HNB-GW 50 includes an HNB I/F (Interface) 51, a CN I/F 52, and a controller 53. The HNB I/F 51 communicates with the HNBs 20_1 to 20_6 through the public network. The CN I/F 52 communicates with the MSC 60 and the SGSN 70. The controller 53 controls the HNB I/F 51 and the CN I/F 52 to relay traffic between the HNB 20, and the MSC 60 and the SGSN 70. In other words, the controller 53 cooperates with the HNB I/F 51 and the CN I/F 52, thereby making the HNB-GW 50 function in a manner similar to that of a typical HNB-GW. As operations specific to this exemplary embodiment, the controller 53 processes messages in compliance with RANAP (Radio Access Network Application Part) protocol (these messages will be sometimes referred to as "RANAP messages"), which are received from each of the MSC 60 and the SGSN 70 through the CN I/F 52. Moreover, the controller 53 generates RRC messages. Note that the specification of RANAP messages has been defined in 3GPP TS 25.413, and the specification of RRC messages has been defined in 3GPP TS 25.331.

Figure 3:
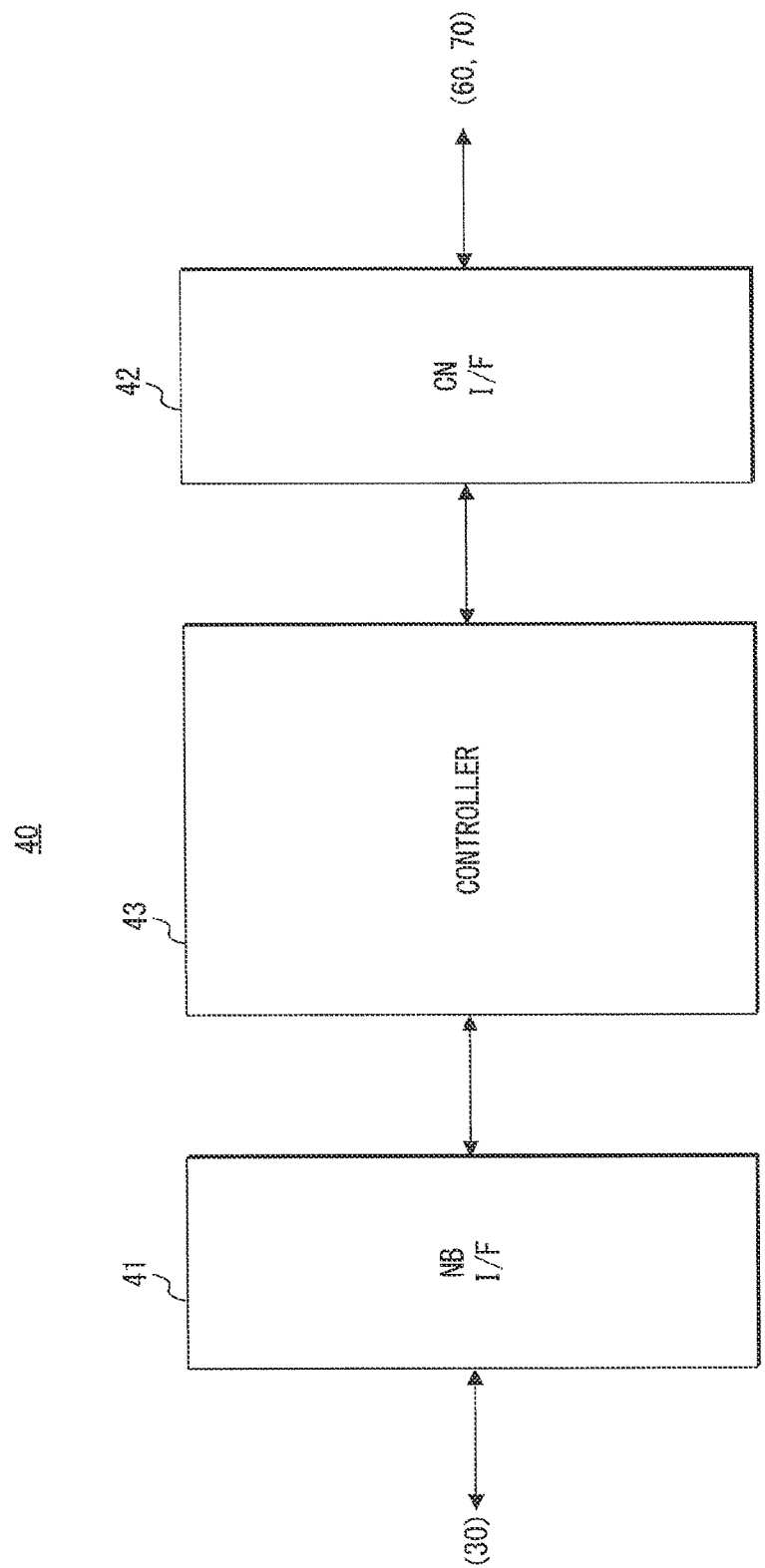
FIG. 3 is a block diagram showing a configuration example of the control device according to the first exemplary embodiment of the present invention.

Further, as shown in FIG. 3, the RNC 40 includes an NB I/F 41, a CN I/F 42, and a controller 43. The NB I/F 41 functions as an interface to the NB 30, and communicates with the UE 10 through the NB 30. The CN I/F 42 communicates with the MSC 60 and the SGSN 70. The controller 43 controls the NB I/F 41 and the CN I/F 42 to control radio resources between the UE and the NB 30. In other words, the controller 43 cooperates with the NB I/F 41 and the CN I/F 42, thereby making the RNC 40 function in a manner similar to that of a typical RNC. As operations specific to this exemplary embodiment, the controller 43 transfers RRC messages, which are received from the HNB-GW 50 through the CN I/F 42, and the MSC 60 and the SGSN 70, to the UE 10 through the NB I/F 41 and the NB 30.

Note that in this exemplary embodiment, there are used typical ones as the UE 10, the HNB 20, the NB 30, the MSC 60 and the SGSN, and therefore explanations regarding the configurations thereof will be omitted.

Next, operations of this exemplary embodiment will be described in detail with reference to FIGS. 4 to 8.

Figure 4:
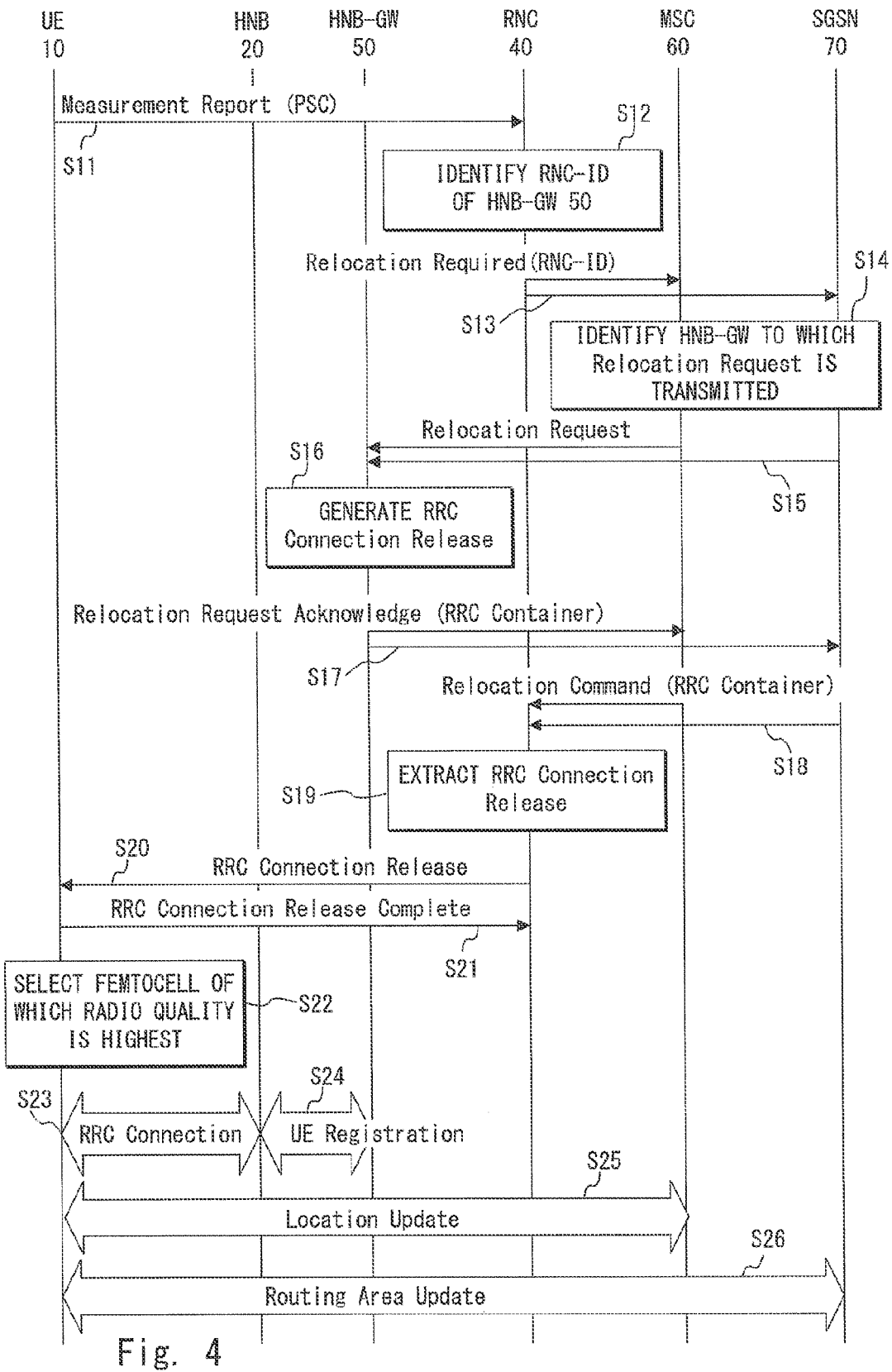
FIG. 4 is a sequence diagram showing an operation example of the gateway and the control device according to the first exemplary embodiment of the present invention.

Assume that the UE 10 camped on the macro cell, and was instructed by the RNC 40 to measure radio quality of a neighboring cell. Further assume that the UE 10 has moved under control of the HNB 20 (within the femto cell). In this case, radio quality of the femto cell becomes higher in terms of the UE 10. Therefore, as shown in FIG. 4, the UE 10 transmits a Measurement Report message to the RNC 40. At this time, the UE 10 includes a PSC of the femto cell in the Measurement Report message (step S11).

When the RNC 40 receives the Measurement Report message, the RNC 40 cannot uniquely identify an HNB serving as a handover destination of the UE 10. This is because there are a plurality of femto cells to which the same PSC as that notified by the Measurement Report message is assigned. However, the RNC 40 determines based on the notified PSC that the HNB-GW 50 is an HNB-GW which is connected to a femto cell serving as the handover destination, and identifies an RNB-ID assigned to the HNB-GW 50 (step S12). For example, the RNC 40 retrieves an RNC-ID corresponding to the notified PSC from a database in which PSCs of femto cells are preliminarily stored in association with RNC-IDs of HNB-GWs. Moreover, it is preferable that the database stores sets of PSCs of femto cells and an ID of an NB in association with RNC-IDs of HNB-GWs. If the database is configured in such a manner, the RNC 40 can uniquely identify the HNB-GW which is connected to the femto cell serving as the handover destination by using the notified PSC and an ID of the NB on which the UE 10 camps, even when femto cells to which the same PSC is assigned are connected to mutually different HNB-GWs and placed within mutually different macro cells.

Assume that both of a CS (Circuit Switching) call and a PS (Packet Switching) call have occurred for the UE 10, and connections to both of the MSC 60 and the SGSN 70 have been established. In this case, the RNC 40 transmits a Relocation Required message, which is one of the RANAP messages, to the MSC 60 and the SGSN 70, respectively. At this time, the RNC 40 includes the RNC-ID identified at above step S12 in the Relocation Required message (step S13). Note that in a case where a connection has been established to one of the MSC 60 and the SGSN 70, the RNC 40 transmits the Relocation Required message to only the node to which the connection has been established.

The MSC 60 and the SGSN 70, which have received the Relocation Required message, respectively identify the HNB-GW 50 from the RNC-ID included in this message (step S14), and then transmit to the HNB-GW 50 a Relocation Request message which is one of the RANAP messages (step S15).

In a typical HNB-GW, a Relocation Request message received from an MSC or an SGSN is transferred to an HNB. However, in this exemplary embodiment, the HNB-GW 50 terminates the Relocation Request message. Alternatively, the HNB-GW 50 generates an RRC Connection Release message which is one of the RRC messages (step S16). FIG. 5 shows a format of the RRC Connection Release message defined in 3GPP TS 25.331. The HNB-GW 50 sets a value "directed signaling connection re-establishment" shown in FIG. 6 to an information element "Release Cause" in the RRC Connection Release message.

Then, the HNB-GW 50 includes the generated RRC Connection Release message in a Relocation Request Acknowledgement message which is one of the RANAP messages, and transmits the Relocation Request Acknowledgement message to the MSC 60 and the SGSN 70, respectively. FIG. 7 shows a format of the Relocation Request Acknowledgement message defined in 3GPP TS 25.413. The HNB-GW 50 sets the RRC Connection Release message to an information element "Target RNC to Source RNC Transparent Container", more particularly to an information element "RRC Container" shown in FIG. 8 in the element "Target RNC to Source RNC Transparent Container" (step S17).

The MSC 60 and the SGSN 70 respectively receive the Relocation Request Acknowledgement message, and then include the element "RRC Container" that is included in this message, in a Relocation Command message which is one of the RANAP messages, thereby transparently transferring the element "RRC Container" to the RNC 40 (step S18).

In a typical RNC, it is required to transfer to a UE an RRC message which is included in the element "RRC Container" of the Relocation Request Acknowledgement message. Generally, the RRC message included in the element "RRC Container" is a message for initiating handover to a new cell. However, in this exemplary embodiment, the RRC message included in the element "RRC Container" is the RRC Connection Release message generated by the HNB-GW 50. Accordingly, the RNC 40 extracts the RRC Connection Release message from the element "RRC Container" (step S19). Then, the RNC 40 transmits the extracted RRC Connection Release message to the UE 10 through the macro cell (step S20).

Thus, the UE 10 autonomously selects a femto cell serving a handover destination, and is handed over to the selected femto cell.

Specifically, 3GPP TS 24.008 has defined that when a UE receives the RRC Connection Release message, the UE should release the RRC connection, immediately re-establish an RRC connection, and initiate a Location Update procedure and a Routing Area Update procedure. Further, 3GPP TS 25.304 has defined that upon releasing the RRC connection, a UE should select an optimum cell and camp on the selected cell.

Therefore, when the UE 10 receives the RRC Connection Release message, the UE 10 performs processing for releasing the RNC connection to the RNC 40, and transmits to the RNC 40 an RRC Connection Release Completion message which is one of the RRC messages (step S21). Then, in accordance with the above definition, the UE 10 selects a cell of which radio quality is the highest (here, the femto cell formed by the HNB 20) (step S22). Further, since the value "directed signaling connection re-establishment" is set to the element "Release Cause" in the RRC Connection Release message, the UE 10 establishes an RRC connection to the HNB 20 immediately after releasing the RRC connection (step S23). At this time, the HNB 20 performs UE Registration processing to the HNB-GW 50. Moreover, the UE 10 performs Location Update processing to the MSC 60, and Routing Area Update processing to the SGSN 70.

As described above, according to this exemplary embodiment, it is possible to achieve the following first and second advantageous effects.

In the method on or before 3GPP Release 8, there has been caused the problem that an RNC cannot identify an optimum femto cell for a UE camping on a macro cell, and thus cannot instruct the UE to be handed over to the optimum femto cell. However, in this exemplary embodiment, the HNB-GW prompts the UE to be autonomously handed over to the optimum femto cell. Thus, it is possible to achieve the first advantageous effect that the UE can be handed over to the femto cell, although the RNC does not identify the optimum femto cell for the UE.

Further, it is possible to achieve the second advantageous effect that the first advantageous effect can be achieved without making any particular modification to UEs which are compatible with the standard on or before Release 8. Moreover, in this exemplary embodiment, it is possible to restrict modifications to the RNC to the minimum necessary. In addition, in this exemplary embodiment, sequences between each of the HNB-GW and the RNC, and the nodes within the core network are performed in compliance with the RANAP protocol. Therefore, it is not necessary to make modifications to the nodes within the core network.

Second Exemplary Embodiment

A network according to this exemplary embodiment can be configured in a manner similar to that shown in FIG. 1. An HNB-GW and an RNC according to this exemplary embodiment can also be configured in a manner similar to those shown in FIGS. 2 and 3.

Figure 9:
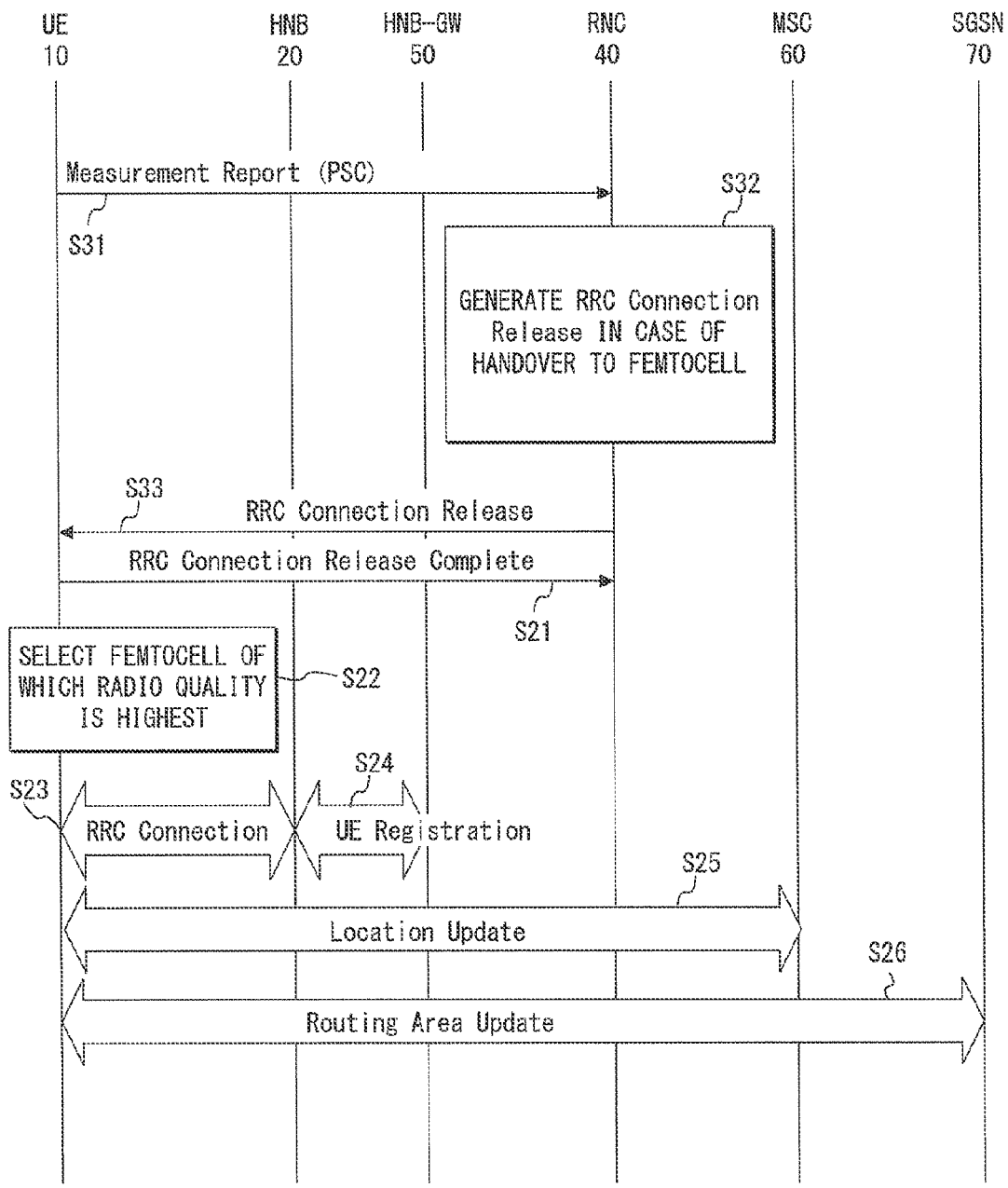
FIG. 9 is a sequence diagram showing an operation example of a control device according to a second exemplary embodiment of the present invention.

Meanwhile, this exemplary embodiment is different from the above-mentioned first exemplary embodiment in that the RNC operates as shown in FIG. 9.

Specifically, as shown in FIG. 9, the RNC 40 receives the Measurement Report message from the UE 10 camping on the macro cell, and then determines based on this message whether or not the UE 10 is to be handed over to the femto cell (HNB 20) (step S31). More particularly, the RNC 40 uses the notified PSC to check whether the cell reported by the Measurement Report message, of which radio quality is higher, is a femto cell or not. As mentioned above, mutually difference PSCs are assigned to the HNB 20 and the NB 30. Accordingly, if the notified PSC is not the one assigned to the NB 30, the RNC 40 determines that the reported cell, of which radio quality is higher, is the femto cell.

As a result, when it is determined that the UE 10 is handed over to the femto cell, the RNC 40 generates the RRC Connection Release message (step S32). Then, the RNC 40 transmits the generated RRC Connection Release message to the UE 10 (step S33).

Thus, the processes at above steps S21 to S26 are executed, so that the UE 10 autonomously selects an optimum femto cell and is handed over to the selected femto cell.

As described above, in this exemplary embodiment, the RNC prompts the UE to be autonomously handed over to the optimum femto cell. Thus, it is possible to achieve the first and second advantageous effects described in the above-mentioned first exemplary embodiment, similarly. In addition, in this exemplary embodiment, it is possible to achieve an additional advantageous effect that modification to the HNB is not required. Moreover, in this exemplary embodiment, it is also possible to achieve an advantageous effect that sequences between each of the RNC and the HNB-GW, and the nodes within the core network, are reduced compared with the above-mentioned first exemplary embodiment.

Note that the present invention is not limited to the above-described exemplary embodiments, and it will be understood by those of ordinary skill in the art that various changes in form and details may be made therein without departing from the spirit and scope of the present invention as defined by the claims.

This application is based upon and claims the benefit of priority from Japanese patent application No. 2011-210566, filed on Sep. 27, 2011, the disclosure of which is incorporated herein in its entirety by reference.

INDUSTRIAL APPLICABILITY

The present invention is applied to a gateway, a control device, and communication controlling methods for the gateway and the control device. In particular, the present invention is applied for the purpose of handing a mobile station (UE), which is compatible with UMTS defined in 3GPP, from a macro cell over to a femto cell.

REFERENCE SIGNS LIST

10 UE
20, 20_1-20_6 HNB
21_1-21_6 FEMTO CELL
30, 30_1-30_4 NB
31_1-31_4 MACRO CELL
40 RNC
41 NB I/F
42, 52 CN I/F
43, 53 CONTROLLER
50 HNB-GW
51 HNB I/F
60 MSC
70 SGSN

The invention claimed is:

1. A gateway that relays traffic between a core network and a plurality of base stations respectively incorporated into the core network through a public network, the gateway comprising:
a first communication unit that communicates with the plurality of base stations through the public network;
a second communication unit that communicates with the core network; and
a control unit that controls the first and second communication units to relay the traffic,
wherein the control unit is configured to:
generate an RRC (Radio Resource Control) Connection Release message comprising a release cause with value "directed signaling connection re-establishment", when the control unit is notified from the core network that a mobile station is handed over to any one of the plurality of base stations; and
cause the core network to instruct a control device to transfer the RRC Connection Release message to the mobile station, the control device having established an RRC connection to the mobile station,
wherein the RRC Connection Release message prompts the mobile station to:
release the established RRC connection;
autonomously select a base station to which the mobile station is handed over; and
newly establish an RRC connection to the selected base station.

2. The gateway according to claim 1, wherein the control unit is configured to:
receive an Relocation Request message as the notification; and
set the RRC Connection Release message as an information element in a message response to the Relocation Request message.

3. A control device that controls radio resources upon wireless communication between a base station and a mobile station, the base station being connected to the control device itself, the mobile station camping on the base station, the control device comprising:
a first communication unit that communicates with the mobile station through the base station;
a second communication unit that communicates with a core network; and
a control unit that controls the first and second communication units to control the radio resources,
wherein the control unit is configured to:
notify, through the core network, a gateway that it is determined that the mobile station is to be handed over to a different base station based on a measurement report regarding radio quality of a neighboring cell, the measurement report being received from the mobile station, the different base station being incorporated into the core network through a public network, the gateway relaying traffic between the core network and the different base station; and
transfer, when an RRC Connection Release message, comprising a release cause with value "directed signaling connection re-establishment", is received from the gateway in response to the notification, the RRC Connection Release message to the mobile station,
wherein the RRC Connection Release message prompts the mobile station to:
release an RRC connection that has been established between the control device and the mobile station;
autonomously select a base station to which the mobile station is handed over; and
newly establish an RRC connection to the selected base station.

4. The control device according to claim 3, wherein the control unit is configured to identify the gateway by using a PSC (Primary Scrambling Code) included in the measurement report.

5. The control device according to claim 4, wherein the control unit is configured to further use, upon identifying the gateway, identification information of a base station that has relayed the measurement report.

6. The control device according to claim 3, wherein the control unit is configured to:
perform the notification by use of a Relocation Required message including identification information of the gateway; and receive the RRC Connection Release message as an information element in a Relocation Command.

7. A method of controlling a gateway that relays traffic between a core network and a plurality of base stations respectively incorporated into the core network through a public network, the method comprising:

generating an RRC Connection Release message comprising a release cause with value "directed signaling connection re-establishment", when it is notified from the core network that a mobile station is handed over to any one of the plurality of base stations; and causing the core network to instruct a control device to transfer the RRC Connection Release message to the mobile station, the control device having established an RRC connection to the mobile station, wherein the RRC Connection Release message prompts the mobile station to:

release the established RRC connection;

autonomously select a base station to which the mobile station is handed over; and newly establish an RRC connection to the selected base station.

8. A gateway that relays traffic between a core network and a plurality of base stations, comprising:

a first interface that communicates with the plurality of base stations via a first network;

a second interface that communicates with the core network; and a processor coupled to the first interface and the second interface, wherein, when the processor receives, from the second interface, a notification that a mobile station has been handed over to a base station of the plurality of base stations, the processor generates a connection release message comprising a release cause with value "directed signaling connection re-establishment" based on the notification, wherein the processor instructs a radio controller to transfer the connection release message to the mobile station, wherein the connection release message is configured to prompt the mobile station to release an established connection with the radio controller, autonomously select the base station to which the mobile station is handed over, and establish a new connection with the selected base station.

9. The gateway according to claim 8, wherein the connection release message comprises an RRC (Radio Resource Control) Connection Release message.

10. The gateway according to claim 8, wherein the notification comprises a Relocation Request message.

11. The gateway according to claim 9, wherein the processor transmits a radio control message to the radio controller, and wherein the radio control message comprises the RRC Connection Release message.

12. A radio controller, comprising:

a first interface that communicates with a mobile station via a first base station;

a second interface that communicates with a core network; and a processor that receives a measurement report from the mobile station regarding quality of a cell and determines whether the mobile station is to be handed over to a second base station based on the measurement report, wherein the second base station is communicatively coupled to the core network, wherein, when the processor determines that the mobile station is to be handed over to the second base station, the processor transmits a handover notification to a gateway through the core network, wherein, when the processor receives a relocation message from the gateway in response to the handover notification, the processor transfers a connection release message comprising a release cause with value "directed signaling connection re-establishment" to the mobile station, wherein the connection release message prompts the mobile station to release an connection that has been established between the radio controller and the mobile station, autonomously select the second base station to which the mobile station is to be handed over, and establish a connection to the second base station.

13. The radio controller according to claim 12, wherein the control processor is further configured to identify the gateway by using a PSC (Primary Scrambling Code) included in the measurement report.

14. The radio controller according to claim 12, wherein the control processor is further configured to, upon identifying the gateway, use identification information of a relaying base station that has relayed the measurement report.

15. The radio controller according to claim 12, wherein the connection release message comprises an RRC (Radio Resource Control) Connection Release message.

16. The radio controller according to claim 15, wherein the notification comprises a Relocation Required message that identifies the gateway, and wherein the relocation message comprises the RRC Connection Release message.

* * * * *